UNITED STATES PATENT OFFICE.

THEODOR KLEMM, OF PFULLINGEN OF REUTLINGEN, NEAR STUTTGART, WÜRTEMBERG, ASSIGNOR TO EDWARD MOSS, OF LONDON, ENGLAND.

IMPROVEMENT IN TANNING HIDES.

Specification forming part of Letters Patent No. 21,168, dated August 10, 1858.

*To all whom it may concern:*

Be it known that I, THEODOR KLEMM, of Pfullingen of Reutlingen, near Stuttgart, in the Kingdom of Würtemberg, have invented certain new and useful improvements in the process of impregnating and converting hides, skins, and other animal tissues into leather; and I do hereby declare that the following is a full, clear, and exact description thereof.

My said invention consists in the preparation for preservation of skins and other animal tissues by impregnating them with compositions or compounds of certain animal, vegetable, and saline substances, or any equivalent therefor, by means of mechanical agitation and heat. The vegetable substances which I prefer to use are such as contain a large proportion of starch and little or no gluten—such as flour of barley, rice, potatoes, &c., or starch itself. The animal matters I prefer to use are ox-brains, milk, butter, oil, tallow-fat, or other grease; and the saline matters I prefer to use are salt or saltpeter, which I find best adapted for preventing the putrefaction of the butter and the brains. The composition I have found to answer best is produced from the following ingredients, in the following proportions: For every one hundred pounds of composition I use of barley-flour twenty-six pounds; brains of oxen, twenty-three pounds; salt or saltpeter, four pounds; unsalted butter, six and a half pounds; milk, twelve and a half pounds; and animal oil—such as neat's-foot oil or horse-grease—twenty-eight pounds. To form these ingredients into the said composition, which should be of a pasty character, the brains and butter are first to be mixed together in any suitable vessel, and the barley-flour is then to be added gradually in small quantities by stirring or kneading it in until it and the brains and butter form a well-incorporated stiff dough. To this dough the milk is to be added gradually in small quantities, so as to reduce it to a somewhat slack dough or stiff paste, and to this paste the animal oil is to be added gradually, aking care to mix it thoroughly during the operation. The salt or saltpeter, being intended principally to preserve the butter and the brains from putrefaction, may be added to either of them before being mixed up as above described; or, if salted butter be employed, a less quantity of salt or saltpeter may be used.

The foregoing composition may be varied as follows: For every one hundred pounds of composition I use of barley-flour twenty-three pounds; brains, forty-six pounds; salt or saltpeter, three and three-quarters pounds; animal oil, twenty-seven and a quarter pounds; or for every one hundred pounds of composition I use of barley-flour twenty-eight and a half pounds; unsalted butter, thirteen and a quarter pounds; salt or saltpeter, four and a half pounds; milk, twenty-five and a quarter pounds; animal oil, twenty eight and a half pounds. According to the nature and quality of the animal oil that can be procured the quantity of this ingredient will sometimes vary. If barley-flour be dispensed with, flour of rice or other liguminous material may be used.

Having thus set forth the nature of the said invention, I will now proceed to describe the manner in which the same may best be carried into effect.

The process of impregnating the skins or other animal substances with the composition by means of heat and mechanical agitation is carried on as follows: The skins, after being unhaired and steeped in water, and then partially dried, are to be placed in a cylinder or apparatus of any suitable construction, which is kept slowly revolving, so as to continually agitate them, the effect of which is to distribute the moisture equally. They are then in a fit state to receive the composition or compound hereinbefore described, and for this purpose are to be laid out flat and smeared or covered over upon the flesh side with the said composition, and are then to be placed in the cylinder or apparatus, which is again kept slowly revolving, so as to continually agitate them, a current of heated air being passed through it for carrying off the moisture and assist in causing the composition to act upon the skins. The temperature of the air for drying the skins before being rubbed over with my composition should be about 75° of Fahrenheit, and two or three hours will generally suffice, as the object is merely to distribute equally the moisture contained in the skins, which have become drier in some parts than in others. When the skins have had the composition once applied the temperature is to be raised to from 85° to about 100° of Fahrenheit's thermometer, and after a second or third or further application to from 100° to 120°. After each application of the composition and agitation of the skins in the revolving apparatus for about six or eight hours they are taken out and hung up to dry partially, care being taken not to allow them to get too dry or hard between each operation. After a second application of the composition and a third treatment in the revolving apparatus thin skins—such as lamb, sheep, &c.—will be found sufficiently impregnated or converted; but stouter skins—such as calf, seal, &c.—will require to be treated a few hours more in the apparatus; and still stouter—such as horse, cow, ox, &c.—are to be agitated a fourth time after being smeared over entirely or only over their stouter portions with the said composition or with warm grease consisting of tallow and animal oil mixed together, or either alone, the tallow making the finished articles stiffer, the oil more pliable. This warm grease may also be usefully applied to any skins previously to the last time of agitating them in the cylinder. The skins are then washed with lukewarm soap and water on the flesh and grain side, and to make them water-proof they are rubbed over with a solution of alum, which forms a caustic clay-earth with the soap in the ordinary manner. Every time the skins are taken out of the apparatus they are stretched on a large table and worked with the usual tools.

The cylinder or apparatus should be furnished in the interior with studs, projections, or shelves for producing an increased action on the skins, and should have several openings for regulating the current of heated air through it and for allowing the moisture to be carried off. The natural color of the skins being white, (after having been unhaired and cleaned,) they may be dyed by applying any desirable mordant and color with a hard brush, and then hung up to dry for a short time before the composition is smeared on.

If preferred, the dyeing may be effected to some extent by mixing coloring or tanning material with the composition.

The further treatment is similar to that of the usual finishing by carriers, leather-dressers, japanners, enamelers, &c., the skins being suitable for any of these processes; but the greater part of the carrier's business has been much facilitated during the process of impregnating or converting into leather. Split skins, bladders, guts, and other animal substances may be treated in the same manner; but the application of the composition and the periods of remaining in the revolving apparatus must be regulated according to each particular substance. To other animal or vegetable materials (in particular such as are fibrous in their raw or manufactured and made-up state) I apply gelatinous matter, which I prepare from the cuttings of skins, and when containing a suitable quantity of moisture I treat these substances in the same manner as the skins of animals. Instead of a revolving cylinder or apparatus, rollers not pressing too closely, or beaters, stampers, or any other suitable mechanical action, may be employed.

I do not wish to be understood as limiting my claim to the use of the special composition of matter herein specified, as the said composition of matter may be varied within the range of my invention.

What I do claim, and desire to secure by Letters Patent, is—

The process of treating and impregnating hides, skins, and other animal tissues by alternately agitating them in a heated atmosphere or current of heated air, and rubbing or smearing them with the substances herein specified, substantially as and for the purpose specified.

THEODOR KLEMM.

Witnesses:
BAPT BERNHEIM,
JOHN SMITH.